United States Patent

Rees et al.

[11] Patent Number: 5,166,999
[45] Date of Patent: Nov. 24, 1992

[54] HIGH RESOLUTION PRINT BAR SYSTEM

[75] Inventors: James D. Rees, Pittsford; Kenneth R. Ossman, Macedon, both of N.Y.

[73] Assignee: Xerox Corporation, Stamford, Conn.

[21] Appl. No.: 782,948

[22] Filed: Oct. 25, 1991

[51] Int. Cl.[5] .......................... G02B 6/00; G02B 6/08
[52] U.S. Cl. ..................................... 385/120; 359/652
[58] Field of Search ............................... 359/652-654; 385/116, 120, 124

[56] References Cited

U.S. PATENT DOCUMENTS

| | | | |
|---|---|---|---|
| 4,331,380 | 5/1982 | Rees et al. | 359/652 X |
| 4,571,022 | 2/1986 | Lama et al. | 385/116 |
| 4,589,736 | 5/1986 | Harrigan et al. | 359/652 |
| 4,715,682 | 12/1987 | Koek et al. | 385/116 X |
| 5,084,714 | 1/1992 | Beaman et al. | 385/116 X |

Primary Examiner—Akm E. Ullah

[57] ABSTRACT

The resolution of an LED print bar used in printing applications is modified by optically coupling the print bar, in a preferred embodiment, to a two row, square ended, reduction enlargement gradient index lens array. The lens array is modified to have a radiometric speed suitable for printing applications (f/3 or faster) with a total conjugate long enough to maintain optical quality at full field. In a preferred embodiment, a nominal 480 spi print bar is coupled to a modified 0.80X R/E lens array to provide a resolution in an image plane of 600 spi. Other embodiments are described which utilize a plurality of print bars with a combination of unity magnification gradient index lens array in conjunction with a modified R/E lens array.

7 Claims, 4 Drawing Sheets

HIGH RESOLUTION PRINT BAR SYSTEM

BACKGROUND OF THE INVENTION

The present invention is related to printing systems incorporating light emitting print bars as the imager, and more particularly, to a printing system using LED arrays in conjunction with novel gradient index lens arrays to increase or decrease resolution of an image in an image plane.

Image print bars used in xerographic recording systems are well known in the art. The print bar generally consists of a linear array of a plurality of discrete light emitting diodes (LEDs) or light reflecting (liquid crystal) elements. Light emitting diode (LED) arrays are preferred for many recording applications. In order to achieve high resolution (spi), a large number of light emitting diodes, or pixels, are arranged in an LED array and means are included for providing a relative movement between the array and the photoreceptor so as to produce a scanning movement of the array over the surface of the photoreceptor. Thus, the photoreceptor may be exposed to provide a desired image one line at a time as the LED array is advanced, relative to the photoreceptor, either continuously or in stepping motion. Each LED in the array is used to expose a corresponding pixel in the photoreceptor to a value determined by image-defining video data information applied to the print bar.

FIG. 1 shows a prior art printing system which includes an LED print bar 10, consisting of an LED array 12 and a gradient index lens array 14 (the array being sold under the name SELFOC TM, a trademark of Nippon Sheet Glass Co. LTD.). Array 12 is selectively addressed by video image signals processed through a control circuit (not shown) to produce a modulated resolution output which is coupled through lens array 14 onto the surface of previously charged photoreceptor belt 16. Upstream of the exposure station is a charge device 18 which places a predetermined charge on the surface of belt 16. As the belt moves in the indicated process direction, array 12 is addressed to provide an exposure pattern in response to the video data input. The exposure pattern begins when the leading edge of the image area 20 reaches a transverse start of exposure line represented by a dashed arrow 22. The exposure pattern is formed of a plurality of closely spaced transverse scan lines 24 shown with exaggerated longitudinal spacing on image area 20. Downstream from the print bar 10 location are conventional development, transfer and fusing stations (not shown) which are well known in the art.

LED print bars are available commercially in resolutions of 240 spi, 300 spi, 400 spi and 480 spi. Although 600 spi bars are presently available, they are relatively expensive. For some systems, multiple resolution print bars are required. For example, a given printer may receive input data signals in bit map form at several resolutions. IBM printers operate at 240 and 480 spi standards, Xerox Corporation at 300 and 600 spi standards. Heretofore, multiple resolution print bar requirements have been met by incorporating two or more print bars, each providing the required resolution.

It is therefore an object of the present invention to provide a printing system utilizing image print bars with the capability of achieving 600 spi resolution at low cost.

It is further object to provide a printing system which can increase the given resolution of a print bar.

It is a still further object of the invention to provide a printing system with a plurality of LED print bars, at least one of the LED print bars having a first and second resolution.

It is a further object to improve the connectivity of multiple printer-to-computer configurations.

These objects are realized by utilizing, in a preferred embodiment, a two row, square ended, reduction/enlargement gradient index lens array, the lens array coupling the print bar output to the image plane. The lens array is modified to maintain the radiometric speed needed to provide quality printing images, while also maintaining quality image formation at full field. More particularly, the present invention relates to an image print bar for forming images at a photosensitive surface moving in a process direction comprising:

at least one LED array including at least one row of LEDs positioned adjacent said photosensitive surface and aligned perpendicular to the process direction of said surface, means for selectively energizing individual LEDs to provide a modulated radiation output at a first characteristic resolution, a reduction/enlargement gradient index lens array mounted in an optically coupled relationship between said LED array and said photosensitive surface, the improvement wherein the lens array has a radiometric speed of at least f/3, and wherein the magnification value of said lens array is set to focus said modulated output onto said photosensitive surface at a second resolution which is different from said first resolution.

DESCRIPTION OF THE INVENTION

Figure 1:
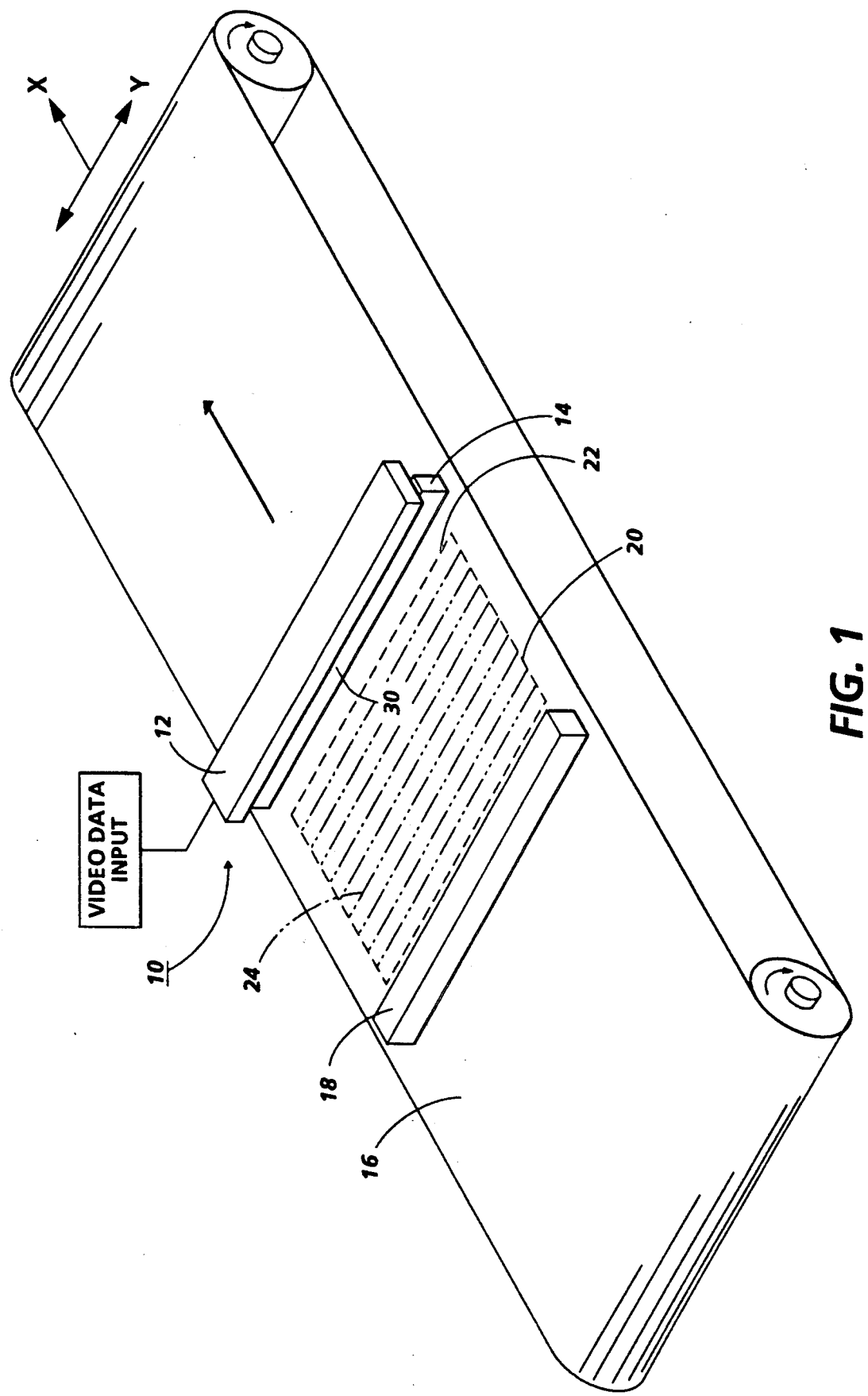
FIG. 1 shows a prior art printer with a print bar comprising an LED array optically coupled to a unity magnification gradient index lens array, forming an image at a photoreceptor.
Figure 2:
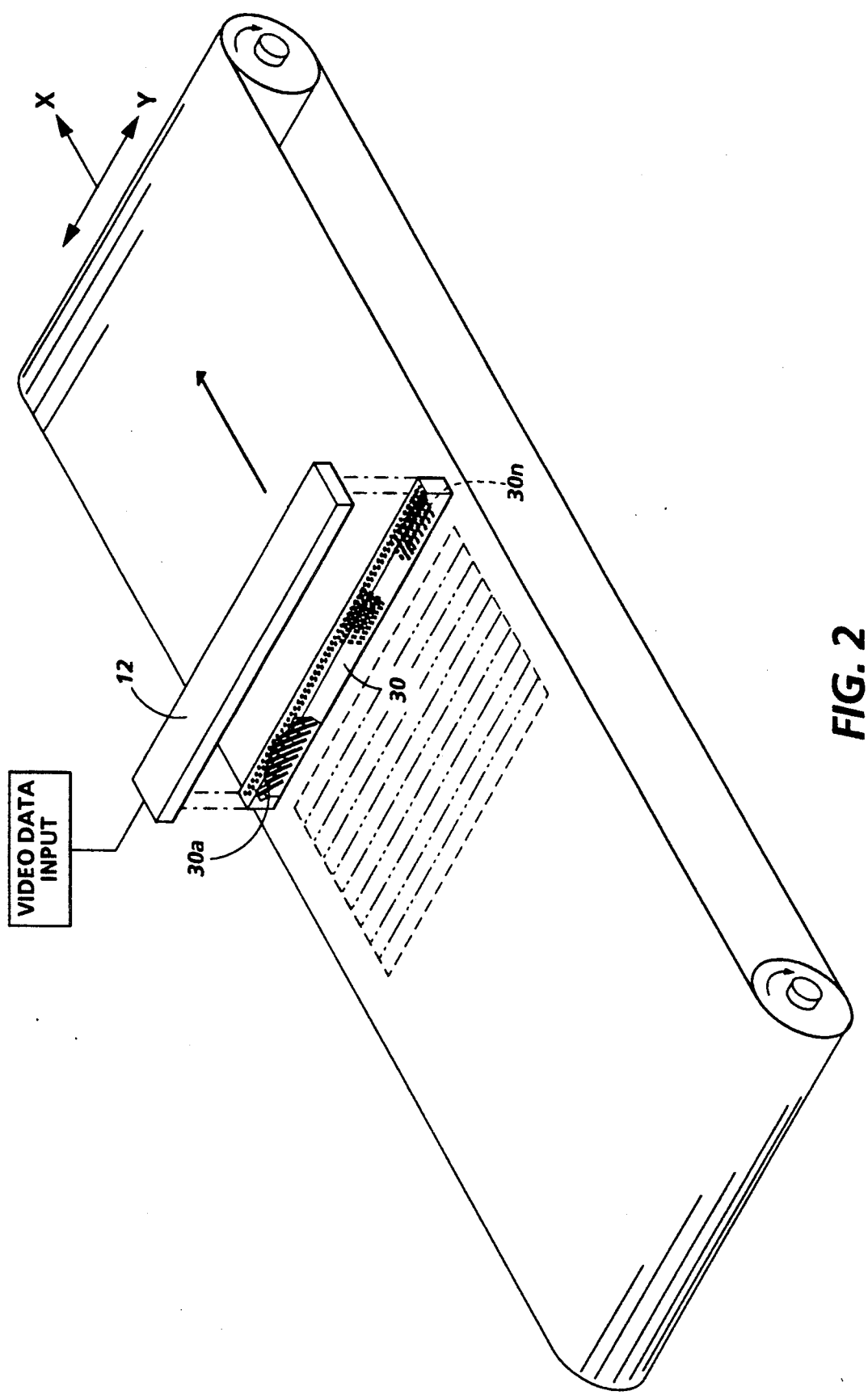
FIG. 2 shows the prior art print bar wherein the resolution of the print bar is increased by optically coupling the output with a two row, square ended, reduction/enlargement gradient index lens array.
Figure 3:
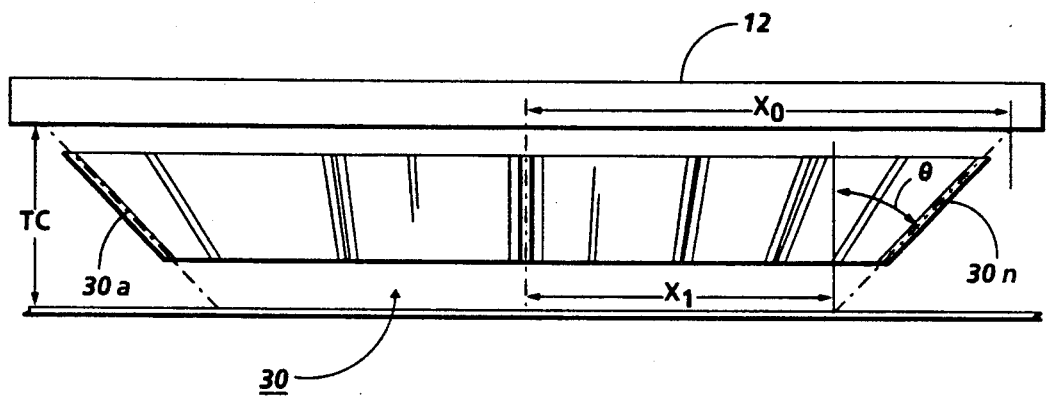
FIG. 3 shows a side view of the print bar of FIG. 2.

FIGS 2 and 3 show the basic system of FIG. 1 modified by replacing the lens array 14 with a reduction/enlargement gradient index lens array 30. In a preferred embodiment, array 30 is a two row, square ended, lens array as disclosed in U.S. Pat. No. 4,589,736 whose contents are hereby incorporated by reference. Lens array 30 may also be a reduction/enlargement lens array as disclosed in U.S. Pat. No. 4,331,380. The lens array described in the '736 patent is an SLA-6 SELFOC lens used in an optical system, having a total conjugate (TC) of about 60-70 mm.

It has previously been suggested in a publication entitled *Optical Method for Creating a ROS with Multiple Resolutions* (K. Ossman, Xerox Disclosure Journal, Vol. 14, No. 4, July/August 1989), that a R/E lens array of the type disclosed in the '736 patent can be used in conjunction with a LED array to increase or decrease resolution of the image. This technique, while acceptable for copier applications, results in lesser quality copies in a more demanding printing environment.

For example, assuming the print bar 12 of FIG. 2 has a resolution of 480 spi and the lens array 30 is an SLA-6, 0.80× reduction gradient index lens array, a resolution of 600 spi would produce image spots at a high resolution (600 spi). However, the radiometric speed (f/5) of the lens array 30 is too slow for printing applications which require at least an f/3 speed.

It is possible to increase the radiometric speed of a 1× SELFOC lens for printing applications; radiometric speed is directly proportional to a gradient constant A, defined by the expression:

$$n(r) = n_0 \left( \frac{1 - Ar^2}{2} \right)$$

where r is the radial distance from the axis of the rod lens and $n_0$ is the axial refractive index. However, the faster the radiometric speed, the shorter the total conjugate of the array lens. For example, in the commercial 1× lens array sold by Nippon Sheet Glass, SLA 12, 20, lens arrays have total conjugates of about 31 mm and 18 mm, respectively.

Thus, in the example of FIG. 2, higher SLA lens arrays (e.g. SLA-12) could be used to obtain a faster radiometric speed of f/2. However, the total conjugate would be decreased from 60-70 mm to about 38 mm. FIG. 3 shows a front view of the lens array 30 of FIG. 2. The optical fibers 30a-30n assume the characteristic fan-shaped configuration with the fiber tilting progressively outward from the center. As shown, endmost fibers 30a, 30n are tilted at an angle θ with respect to the center fiber axis which is perpendicular to the LED array 12 and photoreceptor 16. The angle θ is related to the total conjugate (TC) by the following expression:

$$\tan\theta = \frac{X_0 - X_1}{TC} \quad (1)$$

The value $X_1$ and $X_0$ also define the magnification of lens array 30; e.g.

$$\frac{X_1}{X_0} = \text{mag.}$$

From the above equation, it is evident that angle θ varies with TC; as TC increases angle θ decreases. With the given value of lens array 30 as an SLA-12, 0.08 reduction lens, θ=44°. The endmost fibers configured at this angle, cannot maintain the requisite image quality at the ends of the array. It has been determined that an angle θ of ≦30° would be necessary to do so.

Figure 4:
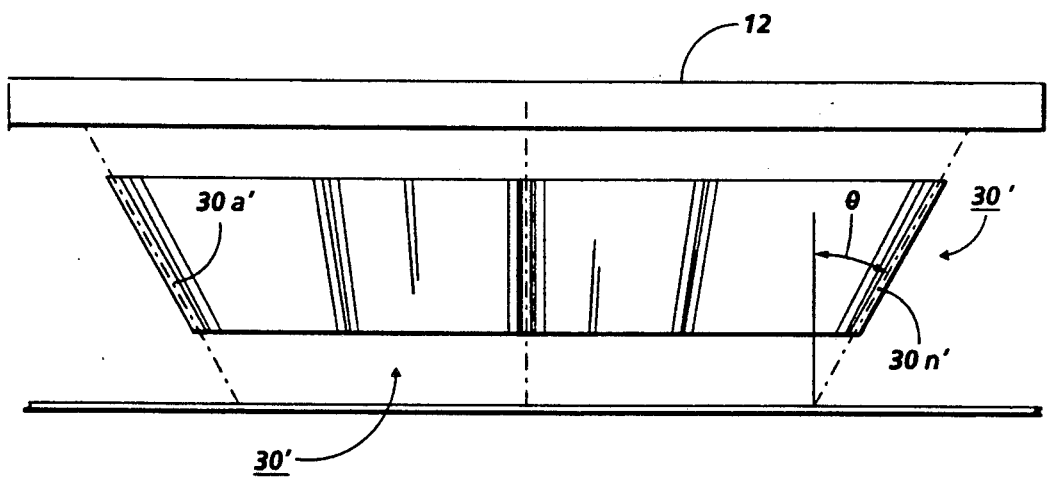
FIG. 4 shows a modification of the print bar of FIG. 3 wherein a novel reduction/enlargement gradient index lens array improves the image quality and radiometric speed of the increased resolution image formed at the photoreceptor.

According to a first aspect of the present invention, lens 30 is modified, as shown in FIG. 4, by lengthening the lens array by one or more pitch segments, each pitch segment equal to $2\pi/\sqrt{A}$ to form a new modified lens assembly 30'. Thus the total conjugate of lens 30' becomes, for an SLA-12 lens array, where $\sqrt{A} = 0.2326$ mm$^{-1}$.

$$\frac{38 \text{ mm} + 2\pi}{\sqrt{A}} = 38 \text{ mm} + 27 \text{ mm} = 65 \text{ mm}$$

With the resulting longitudinal total conjugate, the end fibers 30a', 30n' are tilted at an angle θ of 29.8° which would result in acceptable print quality. Thus, FIG. 4 represents the case where a 480 spi print bar has its resolution increased to 600 spi while maintaining optimum copy quality in the transmitted image. The FIG. 4 embodiment may be further modified by inverting lens 30' and adjusting the object to image position to change the lens function to that of magnification; e.g., to 1.2×. This has the effect of reducing the resolution of print bar 12 to 384 spi.

Figure 5:
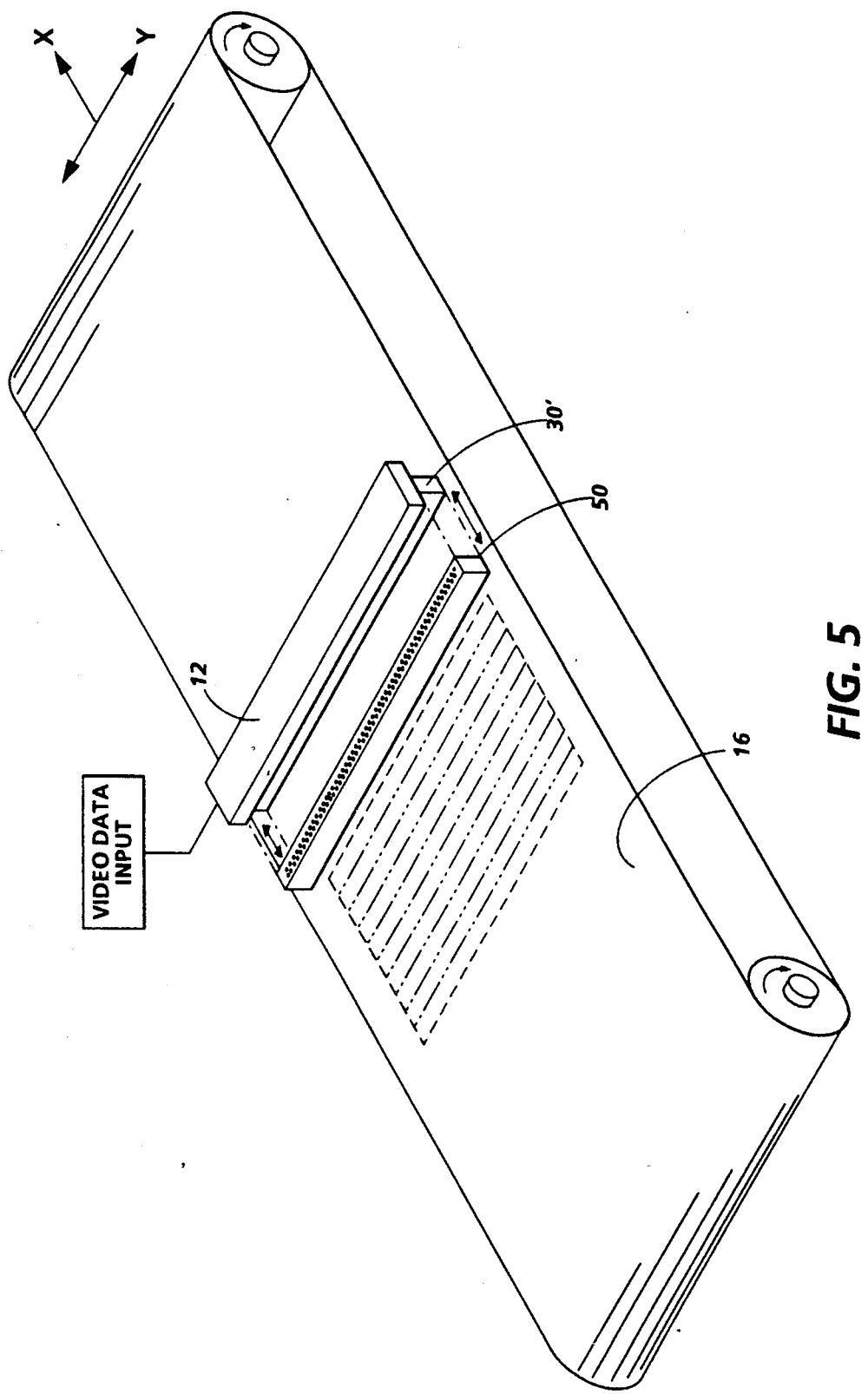
FIG. 5 is a second embodiment of the invention wherein the novel gradient index lens array shown in FIG. 3 is combined with a unity magnification gradient index lens array to increase the resolution choices.

FIG. 5 shows a second aspect of the invention, wherein a 1× gradient index lens array 50, also lengthened by the value of $2\pi/\sqrt{A}$, is movable along with a modified R/E lens 30' to increase the resolution choices available to a plurality of standards. As shown, print bar 12 is optically coupled to photoreceptor 16 surface by 0.8× lens array 30' to provide a 600 spi output resolution. Rotation and repositioning of lens array 30 produces a resolution of 300 spi. When the nominal resolution of 480 spi is required, lens array 50 is moved into the optical coupling position beneath array 12. Various other combinations of print bar lens arrays are possible consistent with the principles of the present invention. Array 12 is a 300 spi printer and lens array 30' is a 0.75× lens, resolutions of 300 spi (lens 50) and 400 spi (lens 30) result. If array 12 is a 400 spi print bar and lens array 30' is a 0.83× lens array, resolution of 240, 400, and 480 spi are enabled.

While the invention has been described with reference to the structures disclosed, it is not confined to the details set forth but is intended to cover such modifications or changes as they come within the scope of the following claims.

What is claimed is:

1. An image print bar for forming images at a photosensitive surface moving in a process direction comprising:

at least one LED array including at least one row of LEDs positioned adjacent said photosensitive surface and aligned perpendicular to the process direction of said surface, means for selectively energizing individual LEDs to provide a modulated radiation output at a first characteristic resolution, a reduction/enlargement gradient index lens array mounted in an optically coupled relationship between said LED array and said photosensitive surface, said gradient index lens array comprising a plurality of gradient index optical fibers arranged in a fan-like configuration, each fiber having planar faces perpendicular to the fiber axis, with the fibers joined together to form two rows, said lens array having tilted end fibers which form an angle, with respect to the central fiber axis equal to or less than 30°, the improvement wherein the lens array has a radiometric speed of at least f/3, and wherein the magnification value of said lens array is set to focus said modulated output onto said photosensitive surface at a second resolution which is different from said first resolution.

2. The assembly of claim 1 wherein said lens array is oriented so as to act as a reduction lens and wherein said second resolution is greater than said first resolution.

3. The assembly of claim 1 wherein the nominal output resolution of said LED print bar is 480 spi and wherein the gradient index lens array provides 0.80X magnification and wherein the resolution of the image formed at the photosensitive surface is 600 spi.

4. The assembly of claim 1 wherein said gradient index lens array is oriented to act as an enlargement lens and wherein said second resolution is less than said first resolution.

5. In a printer system, a line by line exposure apparatus for creating line images at different resolutions on a photoreceptor member moving in a process direction comprising:
   a plurality of image print bars each bar comprising a linear array of a plurality of light emitting diodes (LEDs), each of said print bars having the same characteristic output resolution, and
   at least one gradient index lens array adapted to be coupled to at least one of said print bars to form line images at a second resolution different from said first resolution, said gradient index lens array comprising a plurality of gradient index optical fibers arranged in a fan-like configuration, each fiber having planar faces perpendicular to the fiber axis, with the fibers joined together to form two rows, said lens array having tilted end fibers which form an angle, with respect to the central fiber axis approximately equal to or less than 30°.

6. The printer system of claim 5 further including at least one unity magnification gradient index lens array optically coupled to one of said print bars so as to focus adjacent radiation from said coupled print bar onto said photoreceptor member at said first resolution.

7. A method for changing the output resolution of a LED print bar including the steps of:
   positioning a light modulating array adjacent a photosensitive surface,
   constructing a reduction enlargement gradient index lens array having two rows of optical fibers arranged in a fan-like configuration, each fiber having planar surfaces perpendicular to the fiber axis, the fibers formed with a gradient index value A which imparts to the lens a radiometric speed no greater than f/3, the lens array having tilted end fibers which form an angle equal to or less than 30° with respect to the central fiber axis,
   adjusting the total conjugate (TC) of said lens array by adding pitch segments of one or more periods equal to $2\pi/\sqrt{A}$ until $\theta$ is at the requisite value of approximately equal to or less than 30°, and
   positioning the lens array between the light modulating array and the photosensitive surface so as to optically couple and focus the output radiation of said light modulating array at said photosensitive surface, the output radiation of said focused image being at a value different from the resolution of said light modulating array as a function of the magnification value.

* * * * *